United States Patent [19]

Kabacinski

[11] 4,264,937

[45] Apr. 28, 1981

[54] MAGNETIC TAPE GUIDE ALIGNMENT DEVICE

[75] Inventor: Mariusz Kabacinski, Vienna, Austria

[73] Assignee: U.S. Philips Corporation, New York, N.Y.

[21] Appl. No.: 36,728

[22] Filed: May 7, 1979

[30] Foreign Application Priority Data

May 5, 1978 [AT] Austria ............................ 3274/78

[51] Int. Cl.³ ............................................. G11B 15/66
[52] U.S. Cl. ................................. 360/85; 360/130.23
[58] Field of Search .............................. 360/85, 130.23

[56] References Cited

U.S. PATENT DOCUMENTS

| 4,060,840 | 11/1977 | Umeda | 360/130.23 |
| 4,138,699 | 2/1979 | Ura et al. | 360/85 |

Primary Examiner—Robert S. Tupper
Attorney, Agent, or Firm—David R. Treacy

[57] ABSTRACT

A recording and/or playback apparatus for magnetic tape, having a movable tape guide which moves to a position determined by a stop member for defining a guide axis. Two surfaces on the stop member engage respective parts on the guide element to define the position of the guide element uniquely along all axes, while allowing adjustment of the position of a guide piece along the guide axis.

8 Claims, 2 Drawing Figures

MAGNETIC TAPE GUIDE ALIGNMENT DEVICE

BACKGROUND OF THE INVENTION

The invention relates to an apparatus for recording and/or playing back signals on a magnetic tape carried on two rotatable spools in a cassette and passed over a movable tape guide. The invention relates particularly to a recording and/or playback apparatus of the kind (hereinafter referred to as a helical scan tape recorder) comprising a deck plate, means for supporting the cassette on the deck plate, means for driving one of the spools in the cassette to wind the tape onto that spool and unwind it from the other spool, a rotary magnetic recording and/or playback head supported for rotation relative to the deck plate, a guide drum for the tape, which drum is supported on the deck plate with its axis coinciding with the axis of rotation of the rotary magnetic head, and tape guide means for pulling part of the tape between the spools out of the cassette and laying it on the cylindrical surface of the guide drum and for subsequently guiding the tape along a helical path around part of the cylindrical surface of the drum so that the rotary magnetic head can record and/or play back signals on the tape which are arranged in tracks extending obliquely relative to the longitudinal direction of the tape.

The term "guide drum" is to be understood herein to include a drum composed of separate coaxial parts.

In a known apparatus of the above kind which is described in German Offenlegungsschrift No. 27 19 746, the second position of the tape guide element is defined by a stop member mounted on the deck plate. This stop member is provided with three different stops for determining the position of the tape guide element on the stop member. These stops, together with corresponding parts of the tape guide element, define the height and angular position of the element relative to the deck plate. One stop is constituted by a V-shaped recess, a second stop by a U-shaped recess and a third stop by a contact surface. Such a device for positioning a tape guide is comparatively complicated, and the three stops situated on the stop member have to be mounted very accurately relative to each other. Generally, the positional accuracy of the tape guide element when it has been moved into the second position is extremely important because the position of this tape guide element determines the path of the magnetic tape relative to other parts of the apparatus, specifically the magnetic heads, past which parts the magnetic tape must travel in a very accurately defined direction and angular position.

SUMMARY OF THE INVENTION

According to the present invention there is provided a helical scan tape recorder whose tape guide means comprise a tape guide element which is engageable with the tape and which, in the operation of the tape guide means to pull part of the tape out of the cassette and lay it on the cylindrical surface of the guide drum, moves along a guide path on the deck plate from a first position to a second position where the element defines a guide axis for the tape, and whose stop member is provided with two locating surfaces fixed with respect to the deck plate for defining the second position of the tape guide element, and the first surface preferably being a V-shaped first recess and the second locating surface preferably being a conical or part-spherical second recess; and whose tape guide element has a first part preferably having at least a portion of a circular cylindrical convex surface for cooperation with the first recess in the stop member and a second part preferably having at least a portion of a spherical convex surface for cooperation with the second recess in the stop member, the center of curvature of the spherical surface of the second part lying on the axis of curvature of the circular cylindrical surface of the first part. The engagement of the first part with the first locating surface thus defines the position of the first part along a first axis which is the axis of the V, and a second axis parallel to the deck plate and perpendicular to the V, independent of the height of the element above the deck plate. The engagement of the second part and second locating surface define the height along the guide axis above the deck plate, as well as the position of the second part along axes parallel to the first and second axes.

The term "conical" is to be understood herein to include such surfaces of revolution as frusto-conical.

The tape guide element preferably comprises a spindle on which are mounted the first and second parts of the tape guide element and also a tape guide piece which is rigidly connected to the first part of the tape guide element, the tape guide piece being axially adjustable on the spindle for varying the axial distance between the tape guide piece and the second part.

A compression spring may be arranged around the spindle between the tape guide piece and the second part of the tape guide element.

According to a further preferred embodiment of the invention the central axis of the second recess in the stop member extends parallel to the deck plate, and the stop member comprises a plate, in an edge of which the first recess is formed and which is mounted on a surface of the stop member which extends parallel to the deck plate, the plate being adjustable on this surface for adjusting the position of the first recess by movement relative to the second recess, in any direction in a plane parallel to the deck plate.

In another preferred embodiment, the apparatus includes a bifurcated thrust member which is pivotally connected intermediate its bifurcations to a support which, when the tape guide element is in the second position, is movable towards the stop member to bring the bifurcations into engagement with the tape guide element at two points at or adjacent the first and second parts thereof and exert a thrust on the tape guide element to press and hold the first and second parts into and against the first and second recesses respectively in the stop member.

BRIEF DESCRIPTION OF THE DRAWING

A recording and/or playback apparatus according to an embodiment of the invention in which the tape guide means has two movable tape guide elements will now be described with reference to the accompanying drawing, in which.

DESCRIPTION OF THE PREFERRED EMBODIMENT

Figure 1:
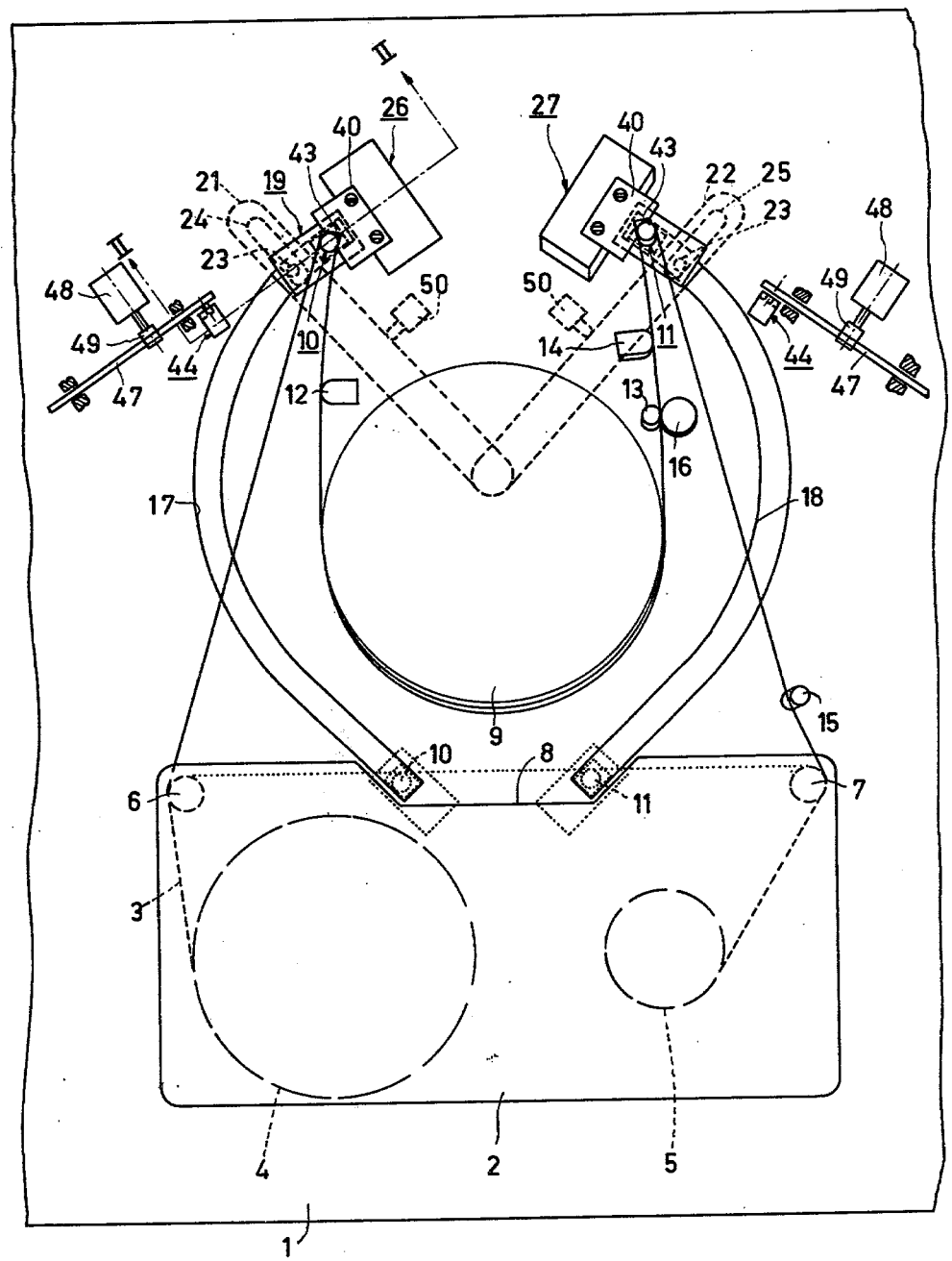
FIG. 1 is a plan view of those parts of the apparatus which are relevant to the invention.

Referring first to FIG. 1, a recording and/or playback apparatus, in the present example a helical scan video recorder, has a deck plate 1 on which is disposed a cassette 2 which accommodates a magnetic tape 3 carried on two spools 4 and 5 in the cassette, which spools are rotatable about parallel axes. The spools may be formed with or without flanges. When the apparatus is in operation the tape is unwound from one spool and wound onto the other. When the cassette is not in use, a part of the tape which extends between two guide rollers 6 and 7 in the cassette passes across an opening 8 in the cassette housing, as indicated by the dotted line 3a in FIG. 1. This part of the tape 3 has to be pulled out of the cassette and laid on the cylindrical surface of a guide drum 9 mounted on the deck plate 1. At this location rotating magnetic recording and/or playback heads (not shown) which are coaxial with the drum 9 and which are supported for rotation relative to the deck plate 1 cooperate with the tape in the operation of the apparatus. For pulling the tape out of the cassette and laying it on the surface of the guide drum 9 there are provided two tape guide elements 10 and 11, each of which is movable along an associated guide path form a first (rest) position, in which it extends behind the tape 3 at the location of the opening 8 in the cassette housing, into a second (operating) position in which they define guide axes around which the tape is guided. In FIG. 1 these two tape guide elements 10 and 11 are represented by uninterrupted lines in the operating position and by broken lines in the rest position. The part of the tape 3 which is pulled out of the cassette and laid on the surface of the guide drum 9, is also represented by uninterrupted lines. When the tape guide elements 10 and 11 are in the operating position the tape 3 extends from the guide roller 6 in the cassette 2, around the tape guide element 10 past an erase head 12, around the guide drum 9 and the rotating magnetic heads past a tape drive capstan 13 and a playback head 14, around the tape guide element 11 and past a guide pin 15 to the guide roller 7 in the cassette. For driving the tape a pressure roller 16 presses the tape against the capstan 13. A drive spindle (not shown) is provided for driving the spool onto which the tape is to be wound. Means not shown are provided for supporting the cassette on the deck plate in a position such that this spool is coaxial with the drive spindle. The guide drum 9, the capstan 13, the playback head 14, the tape guide element 11 and the guide pin 15 are disposed obliquely relative to the deck plate in positions such that the tape 3 travels along a helical path around part of the cylindrical surface of the guide drum and is subsequently returned to the cassette 2.

Figure 2:
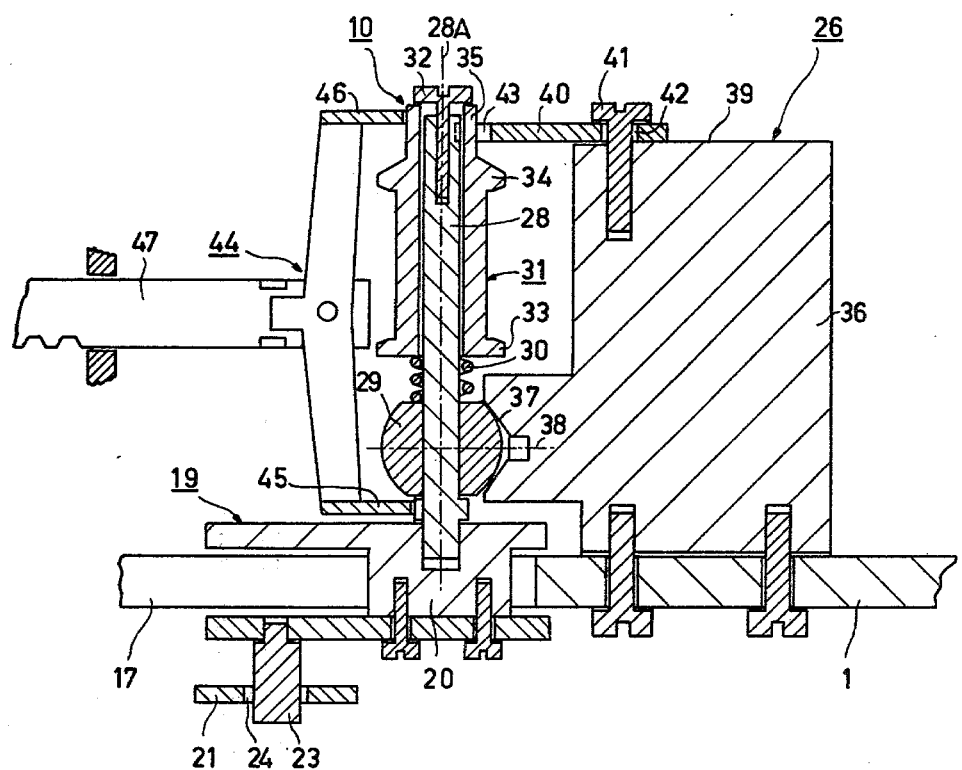
FIG. 2 is a cross-section taken on the line II—II in FIG. 1 but drawn to a larger scale.

For guiding the tape guide elements 10 and 11 from the rest position into the operating position guide tracks 17 and 18 respectively are formed by slots in the deck plate 1 and define guide paths for the tape guide elements around the guide drum 9 on opposite sides thereof. The tape guide elements 10 and 11, as can be seen in FIG. 2, are each carried by support 19 which is formed by a carriage 20 which slides in the respective guide track 17 or 18. The tape guide element 10 is moved by means of a pivotable arm 21 and the tape guide element 11 by means of a pivotable arm 22 through couplings each comprising a pin 23 which is connected to the carriage 20 of the respective tape guide element and which engages in a slot 24, 25 in the respective arm 21, 22.

To allow the tape to be moved between the cassette and its operative position on the guide drum 9 (FIG. 1), the pressure roller 16 is supported so that it can be moved out of the path of the tape during this movement. The movement of the pressure roller is brought about automatically by means (not shown) upon operation of the arms 21 and 22.

As the path of the tape 3 around the guide drum 9 is determined by the tape guide element 10 and 11 in their operating positions, a correct positional adjustment of each of these elements in the operating position is essential. For each of the tape guide elements 10 and 11 there is provided on the deck plate 1 a stop member 26 and 27 respectively which exactly defines the operating position of the relevant tape guide element, as will be described for the tape guide element 10 with reference to FIG. 2. The positioning of the tape guide element 11 is determined in an identical manner.

In the present embodiment the tape guide elements 10 and 11 each have a central spindle 28 (as shown for the tape guide element 10 in FIG. 2), which is supported in an upright position on the carriage 20 of the tape guide element. The longitudinal axis of the central spindle 28 is designated 28A. On this central spindle 28 a spherical part 29 is mounted, as well as a compression spring 30 and a tape guide piece 31, which piece can be moved axially against the biasing force action of the spring 30 by means of an axial screw 32 for adjusting the axial distance between the tape guide piece 31 and the spherical part 29. In this way the height of the tape guide piece 31 above the deck plate 1 can be adjusted. The tape guide piece 31 comprises a substantially cylindrical main portion which is bounded by flanges 33 and 34 for guiding the edges of the tape 3, and at the end which is remote from the spherical part 29 it has a substantially circular cylindrical first part 35 above the flange 34. The tape guide piece 31 may be made of separate parts. Also, a separate tape guide piece may be dispensed with completely, in which case the central spindle 28 itself constitutes the guide for the tape and also the cylindrical part corresponding to the part 35.

The stop members 26 and 27 each comprise a block 36 (as shown for the stop member 26 in FIG. 2) which is secured to the deck plate 1. In this block 36 is formed a part spherical or conical recess 37 whose central axis 38 extends parallel to the deck plate 1 in the approximate direction of travel of the support 19 as it approaches the end of the track adjacent the second position, and which receives the spherical part 29 of the respective tape guide element 10 or 11 when the tape guide element engages the respective stop member 26 or 27. In the present embodiment the block 36 has a flat upper surface 39 which extends parallel to the deck plate 1 and on which is mounted a plate 40 which is secured to the block 36 with screws 41 which pass through holes 42 in the plate 40. The diameter of the holes 42 is slightly larger than that of the shanks of the screws 41 so that the plate 40 can be positionally adjusted on the surface 39 within certain limits and can be fixed in the adjusted position. In one edge the plate 40 has a V-shaped recess 43 which, when the tape guide element engages the stop member, receives the cylindrical part 35 of the tape guide roller 31 (also see FIG. 1). By adjusting the plate 40 on the surface 39, an omnidirectional adjustment of the V-shaped recess 43 relative to the recess 37 is possible in the plane defined by the surface 39, that is to say, adjustment in directions parallel, perpendicular and inclined to the direction of the axis 38 of the recess 37. Thus, the angular position of the tape guide element relative to the deck plate can be defined. If adjustment of the angular position is not necessary, the V-shaped recess may be formed in a part which is with the block 36.

To enable the tape guide element to take up the angular position determined by the V-shaped recess, clearance is provided between the respective support 19 and the deck plate 1 in a direction perpendicular to the deck plate, and between the respective pin 23 and the sides of the associated slot 24, 25 in the respective arm 21, 22, so that the support 19 can tilt slightly relative to the deck plate.

The parts 29 and 35 of each tape guide element may be only portions of spherical or circular cylindrical surfaces respectively, if desired, provided that they are rigidly fixed to the spindle 28 of the tape guide element on the side thereof which faces respective stop member 26.

As already described, the tape guide element 10 travels to the stop member 26 along a predetermined guide path which is defined by the guide track 17 in the deck plate 1. For secure positioning of the tape guide element 10 against the stop member 26, on the deck plate 1 a pivotable bifurcated balanced-thrust member 44 is provided movable towards and away from the stop member 26 and pivotable to a limited extent. The thrust member 44 has two arms 45 and 46 which can engage the tape guide element at or adjacent the spherical part 29 and the cylindrical part 35 thereof respectively. The thrust member 44 is pivotably attached to a toothed rack 47 which can be moved towards and away from the stop member 26 by a pinion 49 driven by a reversible motor 48 (see FIG. 1). When the arm 21 which moves the support 19 of the tape guide element 10 along the guide track 17 has reached its end position adjacent the stop member 26, it actuates a switching device 50 to energize the motor 48 to move the thrust member 44 towards the stop member 26. The thrust member 44 engages the tape guide element 10, which is now in engagement with the stop member 26, and exerts a balanced thrust on the tape guide element at two axially spaced points to press the spherical and cylindrical parts 29 and 35 of the tape guide element into the recesses 37 and 43 respectively of the stop member 36. Returning the thrust member 44 to its inoperative position can be effected simultaneously with the return movement of the tape guide element 10 to the rest position. For example, reversal fof the motor 48 can be initiated through a suitable circuit by operation of the control member or members, for example push buttons, which control the return movement of the tape guide element. The thrust member 44 is shown in the inoperative position in FIG. 1 for the sake of clarity; it should, of course, be in the operative position in this figure. The thrust member 44 may be moved towards and away from the stop member 26 in a manner other than that described; for example, it may be moved by means of a lever, As can be seen from FIG. 1, a balanced-thrust member 44 is also provided for positioning the tape guide element 11 against the stop member 27. The tape guide elements may alternatively be positioned against the stop members by means of levers.

When the tape guide elements 10 and 11 engage the stop member 26 and 27, the spherical part 29 and the cylindrical part 35 of each tape guide element engage in the recesses 37 and 43 respectively of the respective stop member. The thrust member 44 then ensures that the tape guide element precisely engages the stop member without interaction. The spherical part 29 and the recess 37 determine the height adjustment of the tape guide element, and the cylindrical part 35 together with the V-shaped recess 43 determine the angular position of the tape guide element relative to the deck plate. These two adjustments are thus independent of each other, because the cylindrical part 35 is movable in the V-shaped recess 43 when the height is adjusted and the spherical part 29 can pivot in the recess 37 when the angular position is adjusted.

Thus, a highly accurate positional adjustment of the tape guide elements 10 and 11 is obtained, which is always reproduced when the tape guide elements are moved into engagement with the stop members 26 and 27.

Obviously, such an adjustment may be used for all types and applications of tape guide elements whose operating position is adjustable, in cases in which it is essential that the positional adjustment is always accurate and reproducible.

What is claimed is:

1. A helical scan tape cassette recording and/or playback apparatus having a deck plate adapted so that a cassette may be disposed thereon; a cylindrical drum supported on the deck plate; and tape guide means for guiding a tape along a path on a cylindrical surface of the drum, said means including a tape guide element movable from a first position for engaging a tape in a cassette disposed on the deck plate, along a path for pulling part of the tape out of the cassette and laying the tape on the cylindrical surface of the drum, to a second position, in said second position the guide element defining a guide axis for the tape, and a stop member attached to the deck plate for defining the second position with respect to the deck plate, wherein said stop member includes first and second guide element locating surfaces, and the guide element includes respective first and second locating parts arranged to engage the first and second locating surfaces when the element is in the second position; said first surface and first part are shaped to define the position of the first part with respect to the stop member along a first axis perpendicular to the guide axis and along a second axis perpendicular to said first and guide axes, independent of the relative position of the first surface and first part in the direction of the guide axis; and the second surface and second part are shaped to define the position of the second part with respect to the stop member along said guide axis and axes parallel to said first and second axes.

2. An apparatus as claimed in claim 1 wherein said guide element comprises a spindle coaxial with said guide axis, said second part being rigidly fixed to said spindle; a tape guide piece mounted on said spindle for guiding about said guide axis, said first part being rigidly connected to said tape guide piece; and means for axially adjusting the distance between the tape guide piece and said second part.

3. An apparatus as claimed in claim 2, wherein the guide element further comprises resilient means axially biassing the guide piece with respect to the spindle second part, and axial adjustment means for adjustably positioning the guide piece against the biasing force.

4. An apparatus as claimed in claim 3 wherein said resilient means comprises a compression spring surrounding the spindle between the second part and the guide piece, and the axial adjustment means comprises an axial screw engaging said guide piece and said spindle.

5. An apparatus as claimed in claim 2, 3 or 4 wherein said first guide element locating surface is a V-shaped recess, and the portion of said first locating part engaging the V-shaped recess has a cylindrical shape, the cylinder axis being parallel to the guide axis; and the second guide element locating surface and the portion of the second locating part which engages the second locating surface are each surfaces of revolution about an axis parallel to said first axis.

6. An apparatus as claimed in claim 5 wherein said second guide element locating surface is conical, and said portion of the second locating part is spherical.

7. An apparatus as claimed in claim 5 wherein said guide axis is perpendicular to the deck plate, and said stop member includes a stop plate having an edge in which said V-shaped recess is formed; and means for mounting said stop plate on a mounting surface parallel to the deck plate, and for adjusting and securing the position of said stop plate in the directions of said first and second axes.

8. An apparatus as claimed in claim 1 further including a bifurcated thrust member for holding the tape guide element against the stop member, arranged to engage the tape guide element at two points adjacent the first and second locating parts when the element is in the second position; and support means, pivotally connected to the bifurcated member intermediate said two points, for moving the thrust member toward the stop member to engage the guide element so as to press said first and second parts against the respective locating surfaces.

* * * * *